United States Patent
Komatsu

(10) Patent No.: US 7,664,331 B2
(45) Date of Patent: Feb. 16, 2010

(54) LOG DATA RECORDING DEVICE, LOG DATA RECORDING METHOD AND STORAGE MEDIUM STORING PROGRAM

(75) Inventor: Takashi Komatsu, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 698 days.

(21) Appl. No.: 11/386,847

(22) Filed: Mar. 23, 2006

(65) Prior Publication Data
US 2006/0214963 A1 Sep. 28, 2006

(30) Foreign Application Priority Data
Mar. 23, 2005 (JP) ............... 2005-084821

(51) Int. Cl.
G06K 9/36 (2006.01)
B41J 29/38 (2006.01)
G06K 9/46 (2006.01)

(52) U.S. Cl. .................. 382/232; 347/14

(58) Field of Classification Search ........... 382/162, 382/164, 173, 218, 232, 233, 239, 305; 358/1.15, 358/1.16, 426.02, 426.11, 426.03, 462; 375/240.03, 375/240.24; 348/143, 153, 345; 347/14; 725/9
See application file for complete search history.

(56) References Cited

U.S. PATENT DOCUMENTS

| | | | |
|---|---|---|---|
| 5,930,466 A | 7/1999 | Rademacher | |
| 6,263,106 B1 * | 7/2001 | Yamagata | 382/232 |
| 6,330,025 B1 * | 12/2001 | Arazi et al. | 348/143 |
| 6,396,955 B1 * | 5/2002 | Abe | 382/232 |
| 6,792,153 B1 * | 9/2004 | Tsujii | 382/239 |
| 6,968,088 B2 * | 11/2005 | Maeda et al. | 382/239 |
| 7,215,818 B2 * | 5/2007 | Naito | 382/239 |
| 2001/0055336 A1 * | 12/2001 | Krause et al. | 375/240.11 |
| 2002/0120925 A1 * | 8/2002 | Logan | 725/9 |
| 2002/0163964 A1 * | 11/2002 | Nichols | 375/240.03 |
| 2003/0086127 A1 | 5/2003 | Ito et al. | |
| 2005/0179939 A1 * | 8/2005 | Kunihiro | 358/1.15 |
| 2006/0017835 A1 * | 1/2006 | Jacobsen | 348/345 |
| 2006/0214963 A1 * | 9/2006 | Komatsu | 347/14 |

FOREIGN PATENT DOCUMENTS

| | | |
|---|---|---|
| JP | A-11-69032 | 3/1999 |
| KR | 1999-004310 A | 1/1999 |
| KR | 10-2004-0086101 A | 10/2004 |
| TW | 544590 B | 8/2003 |

* cited by examiner

Primary Examiner—Amir Alavi
(74) Attorney, Agent, or Firm—Oliff & Berridge, PLC

(57) ABSTRACT

The present invention provides a log data recording device which records log data concerning a processing of image data. The log data recording device includes a compression unit and a recording unit. If the image data is judged to be a pre-specified document image, the compression unit compresses the image data with a first compression ratio, the first compression ratio is different from a second compression ratio for compressing image data other than the pre-specified document image. The recording unit records the log data including the compressed image data.

21 Claims, 9 Drawing Sheets

F I G. 1
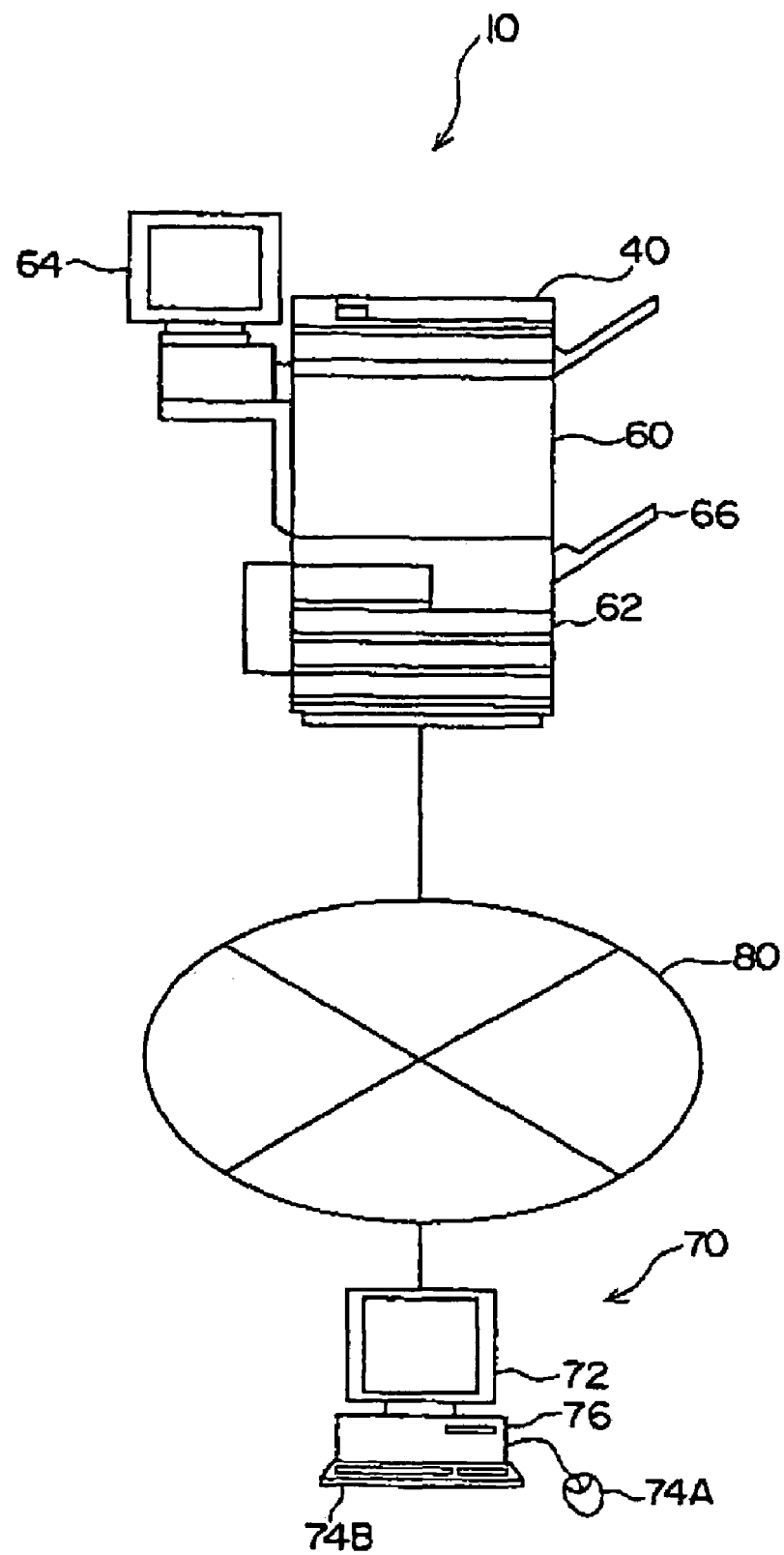

FIG. 3

TEMPLATE DATA 30

| SPECIFIC DOCUMENT IMAGE | CO-ORDINATES |
|---|---|
| A | (30, 15)−(70, 15) |
|   | (30, 15)−(30, 175) |
|   | ⋮ |
| B | ⋮ |
| ⋮ | ⋮ |

TEMPLATE DATA

OUTLINES

TEMPLATE DATA

OUTLINES

FIG. 5

IMAGE COMPRESSION DATA

| SPECIFIC DOCUMENT IMAGE | IMAGE REGION | | COMPRESSION RATIO |
|---|---|---|---|
| | CATEGORY | CO-ORDINATES | |
| A | PHOTOGRAPH PORTION | (10,20)-(70,80) | 40 |
| | TEXT PORTION (NUMBER PORTION) | (120,20)-(210,80) | 60 |
| | TEXT PORTION (OTHER) | (80,45)-(235,80) | 70 |
| | | (85,160)-(185,195) | |
| | OTHER | — | 80 |
| B | ⋮ | ⋮ | ⋮ |
| ⋮ | ⋮ | ⋮ | ⋮ |

F I G. 6

IMAGE LOG DATA

| DATE AND TIME OF OPERATION | PROCESSING DETAILS | | | | | | SPECIFIC DOCUMENT IMAGE | IMAGE DATA |
|---|---|---|---|---|---|---|---|---|
| | READ/PRINT | COUNT | MAGNI-FICATION | PAPER SIZE | INSTRUC-TION SOURCE | | | |
| 2005/3/9 17:55 | PRINT | 3 | 115 | A4 | User1 | | A | (COMPRESSED DATA) |
| 2005/3/10 8:12 | READ | 2 | — | A3 | User2 | | — | (COMPRESSED DATA) |
| ... | ... | ... | ... | ... | ... | | ... | ... |

IMAGE LOG FROM MARCH 9 TO MARCH 16, 2005

| READ/PRINT | PROCESSING DETAILS | | | | INSTRUCTION SOURCE | SPECIFIC DOCUMENT IMAGE | IMAGE |
| --- | --- | --- | --- | --- | --- | --- | --- |
| | COUNT | MAGNI-FICATION | PAPER SIZE | | | | |
| PRINT | 3 | 115 | A4 | | User1 | A | (THUMBNAIL) |
| READ | 2 | — | A3 | | User2 | — | (THUMBNAIL) |
| ... | ... | ... | ... | | ... | ... | ... |

STOP

64

LOG DATA RECORDING DEVICE, LOG DATA RECORDING METHOD AND STORAGE MEDIUM STORING PROGRAM

CROSS-REFERENCE TO RELATED APPLICATION

This application claims priority under 35 USC 119 from Japanese Patent Application No. 2005-084821, the disclosure of which is incorporated by reference herein.

BACKGROUND

1. Technical Field

The present invention relates to a log data recording device and a log data recording method, and more particularly to a log data recording device and log data recording method which, when predetermined processing relating to image data is executed, record log data representing processing details of the predetermined processing in a state which includes the image data.

2. Related Art

In recent years, because of problems with security of information, it has become important to record, in relation to an image which is copied by a copier, an image which is printed by an image formation device or the like, log data, which represents processing details of the copying, printing or the like, in a state in which the log data includes image data representing the image.

However, making a record which includes the whole of the image data that has been subjected to copying, printing or the like in the log data requires a very large recording space, and is virtually impossible when corresponding costs are considered.

In order to overcome this, reducing the size of the image data by performing compression processing on the image data has been considered. However, quality of an image which is reproduced from the image data subsequent to compression processing deteriorates as a result, it becomes impossible to visually verify the image, and there is no point to recording the image data as log data. In particular, significant problems are caused by leakages of information from images of documents which include personal information, such as licenses, medical records, passports and the like, but in relation to images of such documents, it is necessary to be able to satisfactorily verify reproduced images visually.

SUMMARY

The present invention has been made in view of the above circumstances and provides a log data recording device and a log data recording method.

A first aspect of the present invention is a log data recording device which records log data concerning a processing of image data. The log data recording device includes a compression unit and a recording unit if the image data is judged to be a pre-specified document image, the compression unit compresses the image data with a first compression ratio, the first compression ratio is different from a second compression ratio for compressing image data other than the pre-specified document image. The recording unit records the log data including the compressed image data.

A second aspect of the present invention is a log data recording method for recording log data concerning a processing of image data. The method includes followings. If the image data is judged to be a pre-specified document image, the image data are compressed with a first compression ratio, the first compression ratio is different from a second compression ratio for compressing image data other than the pre-specified document image. The log data including the compressed image data are recorded.

A third aspect of the present invention is a storage medium readable by a computer. The storage medium stores a program of instructions executable by the computer to perform a function for recording log data concerning a processing of image data. The function includes the followings. If the image data is judged to be a pre-specified document image, the image data are compressed with a first compression ratio, the first compression ratio is different from a second compression ratio for compressing image data other than the pre-specified document image. The log data including the compressed image data are recorded.

BRIEF DESCRIPTION OF THE DRAWINGS

An embodiment of the present invention will be described in detail based on the following figures, wherein:

FIG. 1 is a schematic view showing structure of a digital multifunction device relating to an embodiment of the present invention, and a state of connection of the digital multifunction device with an external device;

FIG. 3 is a schematic diagram showing a data structure of template data relating to the embodiment of the present invention;

FIG. 5 is a schematic diagram showing a data structure of image compression data relating to the embodiment of the present invention;

FIG. 6 is a schematic diagram showing a data structure of image log data relating to the embodiment of the present invention;

FIG. 9 is a schematic diagram showing an example of an image displayed by the image log display processing program relating to the embodiment of the present invention.

DETAILED DESCRIPTION

Figure 2:
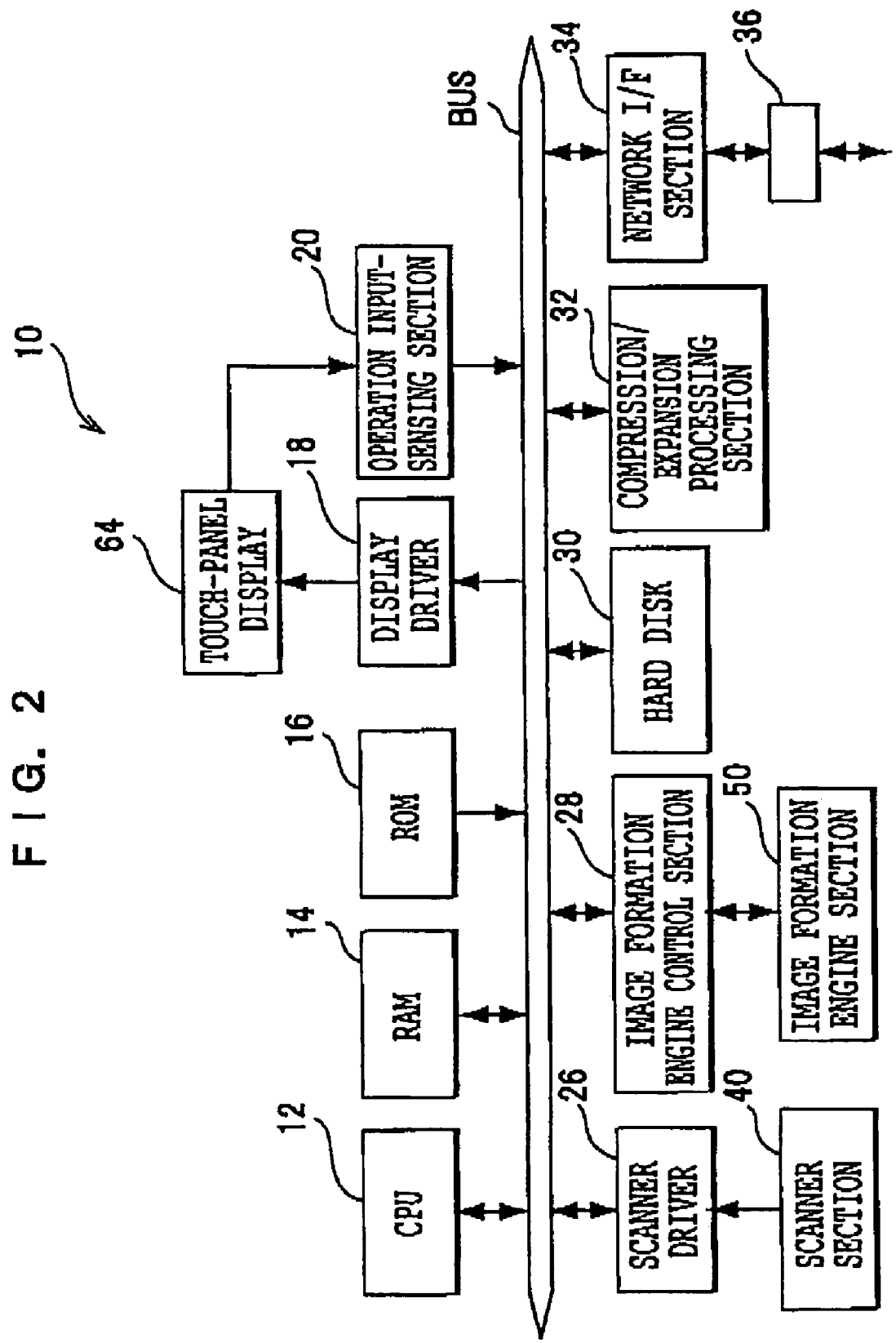
FIG. 2 is a block diagram showing structure of principal elements of an electronic system of the digital multifunction device relating to the embodiment of the present invention.

Herebelow, an embodiment of the present invention will be described in detail with reference to the drawings. Here, the present invention is described by a case of application to a digital multifunction device which includes: an external connection function for connecting to an external device via a network to be capable of communication; an image acquisition function for reading an image; and an image formation function for forming (printing) an image, which is represented by image data which has been acquired from an external device by the external connection function, image data which has been acquired by the image acquisition function, or the like.

As shown in FIG. 1, a digital multifunction device 10 relating to the present embodiment includes a scanner section 40, a device main body 60, a paper supply apparatus 62, a touch-panel display (below referred to as a "display") 64 and an ejection tray 66. The scanner section 40 reads an image from an original placed at a predetermined reading position to acquire image data representing an image of the original. The device main body 60 uses the image data acquired by the scanner section 40, image data acquired from an external device or the like to perform image formation processing. The paper supply apparatus 62 supplies recording paper to the device main body 60. The display 64 displays various kinds of information, such as menu screens, messages and the like, and is integrally provided with a transparent-type touch-panel at a display screen. The ejection tray 66 retains recording paper at which images have been formed and which has been ejected from the device main body 60.

In the digital multifunction device 10 relating to the present embodiment, an image formation engine section 50 (see FIG. 2), which performs processing for formation of images on recording paper by an electrophotography system, is provided at the device main body 60. Further, in the digital multifunction device 10, a pressure sensing-type panel is employed as the aforementioned touch-panel, and a user can instruct various operations by touching the display screen of the display 64 with their fingers (touch-operation). Further, in the digital multifunction device 10, when image formation processing is to be implemented by the image formation function, it is possible to specify, via the display 64, a number of images to be formed, a type (paper size) of recording paper, and an image magnification ratio of the image formation. In addition, the scanner section 40 relating to the present embodiment has a function for detecting size of the original.

Meanwhile, the digital multifunction device 10 relating to the present embodiment is connected by the external connection function to an external device, such as a personal computer (below referred to as a "PC") 70 or the like, via a network 80. The digital multifunction device 10 can acquire image data to serve as an object of image formation from an external device such as the PC 70 or the like, and is conversely capable of transmitting image data acquired by the scanner section 40 to an external device such as the PC 70 or the like.

Here, the PC 70 features a display 72, a mouse 74A, a keyboard 74B and a computer main body 76. The display 72 displays various kinds of information. The mouse 74A is for instruction by pointing to positions on a screen of images displayed at the display 72. The keyboard 74B is for performing input of text information and the like. The computer main body 76 administers overall operations of the PC 70. This is an ordinary structure, so further descriptions of the PC 70 will not be given.

Next, structure of principal elements of an electronic system of the digital multifunction device 10 will be described with reference to FIG. 2.

The digital multifunction device 10 is provided with a CPU (central processing unit) 12, RAM 14, ROM 16, a display driver 18 and an operation input-sensing section 20. The CPU 12 administers overall operations of the device. The RAM 14 is utilized as a work area during execution of various programs and the like. Various programs, various parameters and the like are pre-memorized at the ROM 16. The display driver 18 performs control for display of various kinds of information at the display 64, and the operation input-sensing section 20 detects touch-operations at the display 64.

The digital multifunction device 10 is also equipped with a scanner driver 26, an image formation engine control section 28, a hard disk 30, a compression/expansion processing section 32 and a network I/F (interface) section 34. The scanner driver 26 controls operations for reading of optical images by the scanner section 40. The image formation engine control section 28 controls various sections of the aforementioned image formation engine section 50. The hard disk 30 is for pre-memorizing various kinds of information. The compression/expansion processing section 32 performs compression processing and expansion processing on image data. The network I/F section 34, via a connector 36, implements transmission and reception of various kinds of information to and from external devices connected to the network 80.

The above-described CPU 12, RAM 14, ROM 16, display driver 18, operation input-sensing section 20, scanner driver 26, image formation engine control section 28, hard disk 30, compression/expansion processing section 32 and network I/F section 34 are electrically connected to one another via a system bus BUS.

Accordingly, the CPU 12 can implement each of: access to the RAM 14, the ROM 16 and the hard disk 30; display via the display driver 18 of various kinds of information at the display 64; acquisition via the operation input-sensing section 20 of operational details of touch-operations by a user at the display 64; control of operations of the scanner section 40 via the scanner driver 26; control of operations of the image formation engine section 50 via the image formation engine control section 28; control of operations of the compression/expansion processing section 32; and transfer of various kinds of information to and from external devices via the network I/F section 34 and the connector 36.

Now, an image log registration function and an image log display function are installed in the digital multifunction device 10 relating to the present embodiment. The image log registration function records log data when predetermined processing relating to image data is executed (i.e., in the present embodiment, either of image acquisition processing by the image acquisition function and image formation processing by the image formation function, which are below referred to as "predetermined image processing"). The log data represents processing details of the predetermined image processing, in a state in which the image data is included therein. The image log display function displays the log data which has been registered by the image log registration function.

In the image log registration function relating to the present embodiment, it is judged whether or not the image data to be recorded as log data is data that represents a pre-specified document image (below referred to as a "specific document image"). When the image data is data representing a specific document image, the image data is compressed by the compression/expansion processing section 32 with a compression ratio being lowered relative to other images.

Figure 4A:
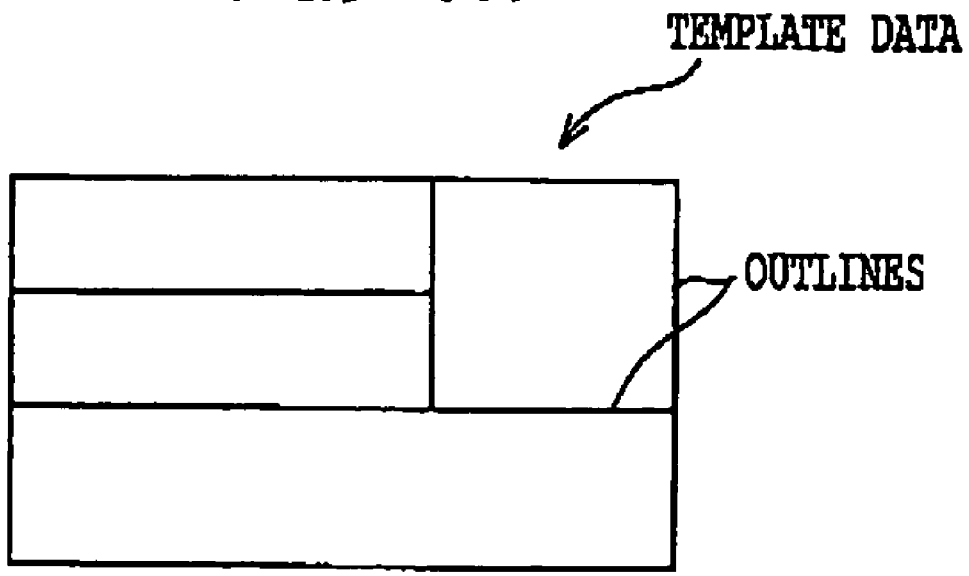
FIGS. 4A and 4B are diagrams for explanation of the template data relating to the embodiment of the present invention, being schematic views which show examples of images represented by the template data.
Figure 4B:
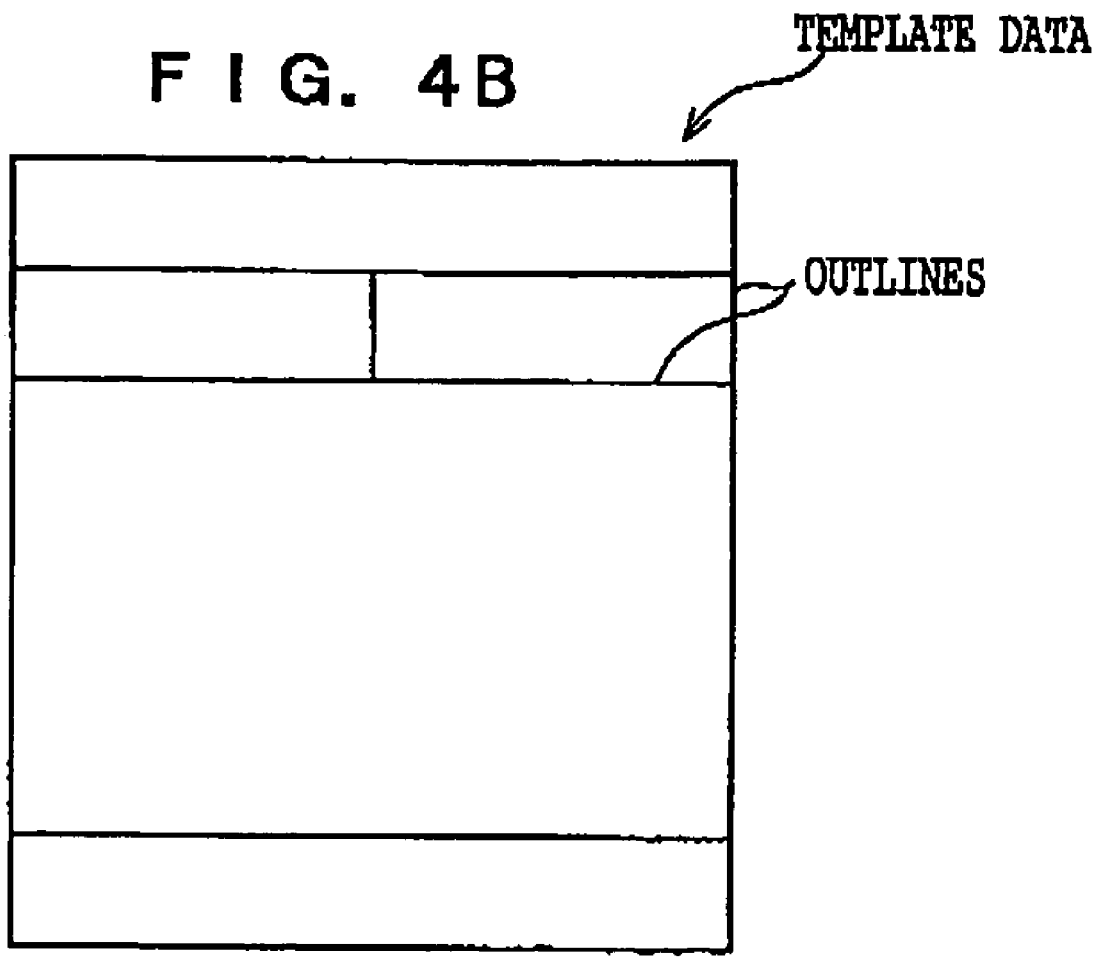

Accordingly, template data which represents characteristics of the specific document images, as shown by an example in the schematic diagram of FIG. 3, is pre-memorized together with information representing the corresponding specific document images, at a predetermined region of the hard disk 30 of the digital multifunction device 10. Here, in the digital multifunction device 10 relating to the present embodiment, as shown by examples in FIGS. 4A and 4B, data which represents outlines of the specific document images is employed as the template data, and co-ordinate data representing positions of start points and finish points of the outlines (data of horizontal direction and vertical direction co-ordinates, with a top-left corner of the corresponding specific document image being an origin point) is employed for the corresponding specific document images.

Hence, in the image log registration function relating to the present embodiment, it is judged whether or not the image data is data representing any of the specific document images by pattern-matching of the image data which is an object of recording with the above-described template data.

Further, for the image log registration function relating to the present embodiment, compression ratios are pre-specified for each specific document image and for each of image regions of different categories, and data representing these compression ratios (below referred to as "image compression data") is pre-memorized at a predetermined region of the hard disk 30.

In the image compression data relating to the present embodiment, as shown in the example in FIG. 5, information representing image regions and information representing the compression ratios to be applied to the image regions is memorized for each set of information representing a corresponding specific document image. In the example shown in FIG. 5, as the categories of image region, four categories are specified: a photographic image (a "photograph portion"); an image representing text string of predetermined numbers (a "text portion (number portion)"); an image representing text string other than the predetermined numbers (a "text portion (other)"); and an image other than those images ("other"). As the data representing image regions of these images, co-ordinate data is memorized (data of co-ordinates in the horizontal direction and the vertical direction with a top-left corner of the corresponding specific image region being an origin point, which co-ordinate data represents positions of top-left corner points and bottom-right corner points of the corresponding image regions in the present embodiment).

Hence, in the image log registration function, for image data representing a specific document image, compression processing is implemented in accordance with the image compression data under conditions such that the compression ratio is varied between respective image regions. Accordingly, the compression/expansion processing section 32 relating to the present embodiment is structured as a section which is capable of compressing the image data that is an object of compression processing with the compression ratios that are specified for each specified image region.

Hence, in the image log registration function relating to the present embodiment, as shown by an example in FIG. 6, when predetermined image processing is executed, information representing processing details which have been specified by a user, information representing a specific document image if it has been judged that the image data which is an object of recording is data representing any of the specific document images, and image data subsequent to compression processing thereof are recorded, together with information representing a date and time at which the predetermined image processing is executed. In the image log registration function relating to the present embodiment, as information representing the above-mentioned information representing processing details, the following are recorded: information representing which of image acquisition processing and image formation processing is the predetermined image processing ("Read/Print"); information representing a number of images to be read or a number of images to be printed ("Count"); in a case in which the predetermined image processing is the image formation processing, information representing an image formation magnification ("Magnification"); information representing an acquired image size or the size of recording paper which is an object of image formation ("Paper Size"); and, when the image formation processing is executed by instructions from an external device such as the PC 70 or the like via the network 80, information representing the external device ("Instruction Source", which herein is information representing a user login name). Further, in the image log registration function relating to the present embodiment, the above-mentioned information representing date and time is acquired by reading from a clock timer built in the digital multifunction device 10.

In the image log registration function relating to the present embodiment, it is further judged whether or not the predetermined image processing has been performed with a pre-specified special condition. If it is judged that the image represented by the image data that is the object of recording is not a specific document image and it is judged that the predetermined image processing has been performed with a pre-specified special condition, the image data is compressed with a compression ratio which is lowered relative to a case in which it is judged that the image represented by the image data that is the object of recording is not a specific document image and it is judged that the predetermined image processing has not been performed with a pre-specified special condition.

In the digital multifunction device 10 relating to the present embodiment, as the above-mentioned special conditions, the following conditions apply: that a reduction ratio is a special ratio when an operation is performed for shrinking the image represented by the image data for formation; that a magnification ratio is a special ratio when an operation is performed for enlarging the image represented by the image data for formation; and that a recording paper size is a special size when operations are performed for forming the image represented by the image data.

That is, ordinarily, when a reduced image or a magnified image is to be formed, it is common for reduction or magnification to be performed from a regular size to a regular size which differs from the first regular size, such as, for example, a reduction from A3 size to A4 size or a magnification from B5 size to A4 size. In such cases, the reduction ratio or magnification ratio is a pre-specified ratio, such as 70%, 115% or the like. Accordingly, in the digital multifunction device 10 relating to the present embodiment, for example, when a ratio is specified which is different from the ratios for performing reduction or magnification from regular sizes to regular sizes, such as, for example, 75% or 110%, this reduction ratio or magnification ratio is treated as special.

Further, when an image is to be formed, it is ordinarily usual to apply a regular size, of A5 or above. Accordingly, in the digital multifunction device 10 relating to the present embodiment, for example, when image formation onto recording paper of less than A5 size is specified, this recording paper size is treated as special.

Anyway, in the digital multifunction device 10 relating to the present embodiment, document images which include personal information, such as licenses, medical records, passports and the like, are applied as the above-mentioned specific document images, for example.

Figure 7:
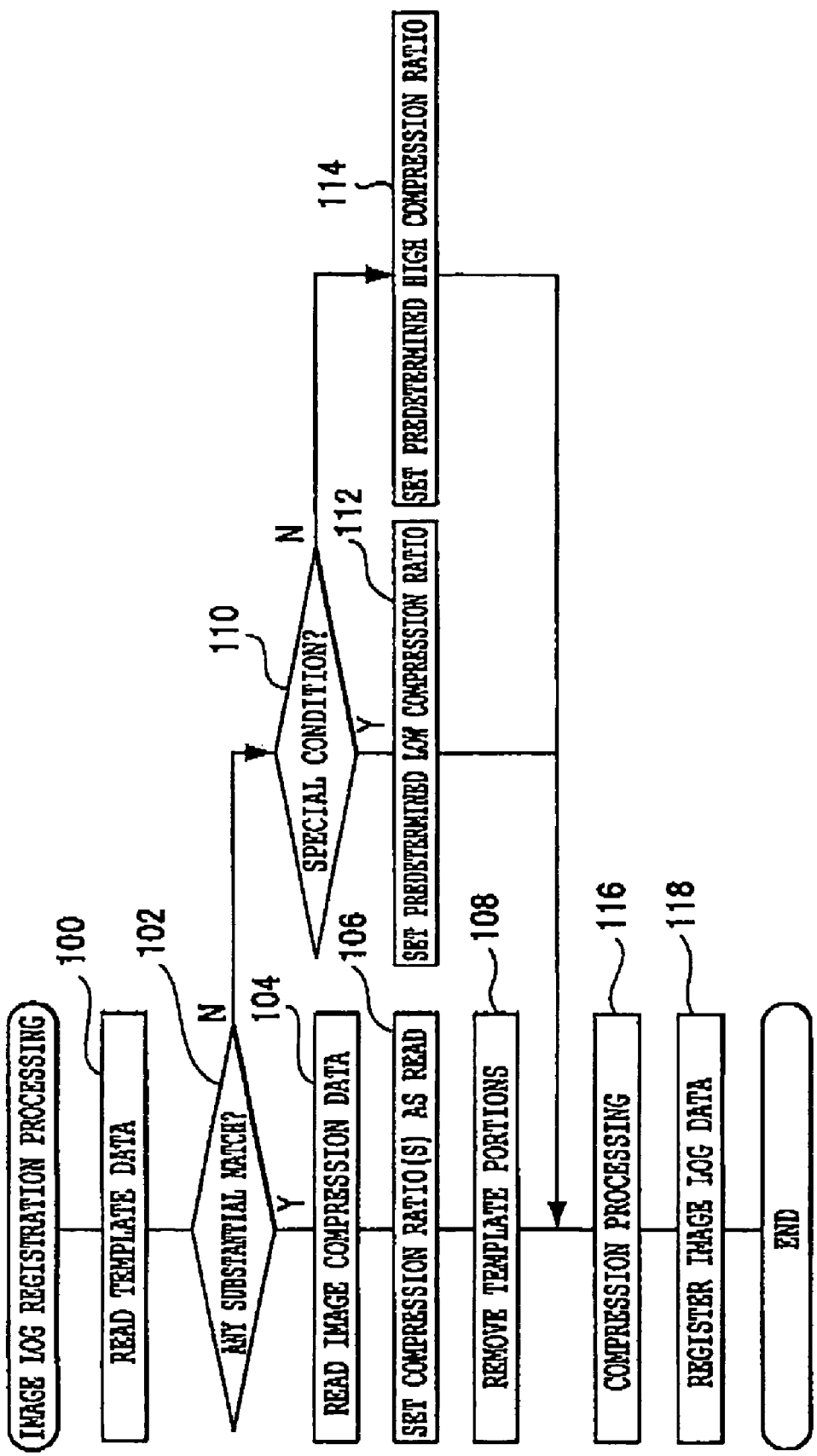
FIG. 7 is a flowchart showing a flow of processing of an image log registration processing program relating to the embodiment of the present invention.

Next, with reference to FIG. 7, operation of the digital multifunction device 10 at a time of execution of the image log registration function will be described. FIG. 7 is a flowchart showing a flow of processing of an image log registration processing program, which is executed by the CPU 12 of the digital multifunction device 10 when image acquisition processing or image formation processing is executed. This program is memorized beforehand at a predetermined region of the ROM 16. Herebelow, image data which is acquired by the image acquisition processing or image data which is employed in image formation by the image formation processing is referred to as "processing object image data", the image represented by the processing object image data is referred to as the "processing object image", and the image acquisition processing or image formation processing that is executed is referred to as the "executed image processing".

In step 100 of FIG. 7, all the template data (see FIG. 3) is read from the hard disk 30. In a subsequent step 102, pattern-matching is performed between the processing object image data and the template data which has all been read out, and it is judged whether or not there is a substantial match with the processing object image among the pre-registered specific document images. If this determination is positive, the control advances to step 104. Here, in the image log registration processing program relating to the present embodiment, as the pattern-matching of step 102, a process is employed in which: all image data representing straight line images is exacted from the processing object image data by a conventionally known straight-line image extraction algorithm; positions in the processing object image of all of these straight-line images are compared with positions of all outline images represented by the template data which has been read out; and it is judged that a specific document image that has at least a predetermined number of template data items (herein, a number which is 90% of the number of template data items provided in the respective specific document image) for which differences between these positions are within a predetermined tolerance range substantially matches the processing object image.

In step 104, the image compression data (information representing image regions and information representing compression ratios) corresponding to the specific document image that has been determined to substantially match in step 102 (below referred to as the "applicable specific document image") is read from the hard disk 30. In a next step 106, the compression/expansion processing section 32 is set so as to compress the processing object image data with the compression ratios represented by the information representing compression ratios that has been read, at the respective image regions represented by the information representing image regions that has been read. Thereafter, the control advances to step 108. Note that, in the above-described step 102, it is possible that a plurality of applicable specific document images may be detected. In such a case, the applicable specific document image with the highest degree of matching (the greatest number of template data items for which differences between the aforementioned positions are within the predetermined tolerance range) will be employed.

In step 108, processing to erase the template data of the applicable specific document image from the processing object image data is performed (herein, processing to replace image data corresponding to the outline images represented by the template data of the applicable specific document image with image data representing white space). Thereafter, the control advances to step 116.

Meanwhile, if the determination of step 102 is negative, the control advances to step 110, and it is judged if the executed image processing is image formation processing and whether or not the image formation processing has been performed with the aforementioned special condition(s). If this judgment is positive, the control advances to step 112, and the compression/expansion processing section 32 is set so as to compress the processing object image data with a predetermined low compression ratio (40% in the present embodiment) at all image regions. The predetermined low compression ratio is pre-specified as a compression ratio which is lower than a predetermined high compression ratio, which will be described later. Thereafter, the control advances to step 116.

On the other hand, if the judgment of step 110 is negative, the control advances to step 114, the compression/expansion processing section 32 is set so as to compress the processing object image data with the predetermined high compression ratio (80% in the present embodiment) at all image regions, and the control thereafter advances to step 116.

In step 116, the compression/expansion processing section 32 is instructed to execute compression processing on the processing object image data. Accordingly, the compression/expansion processing section 32 implements compression processing with the compression conditions specified in one of step 106, step 112 and step 114. At the compression/expansion processing section 32 relating to the present embodiment, the JPEG (Joint Photographic Experts Group) format is employed as a compression format.

Then, in a next step 118, the information representing the processing details of the executed image processing, the information representing the specific document image in a case in which the processing object image data has been judged to be data representing one of the specific document images, and the information representing the date and time at which the executed image processing has been executed are recorded (registered) to the hard disk 30 as image log data (see FIG. 6), in a state in which the processing object image data which has been compressed by the compression/expansion processing section 32 is included therein. Thereafter, the present image log registration processing program ends.

The processing of step 102 of this image log registration processing program corresponds to a judging step of the present invention, the processing of step 116 corresponds to a compressing step of the present invention, and the processing of step 118 corresponds to a recording step of the present invention.

Figure 8:
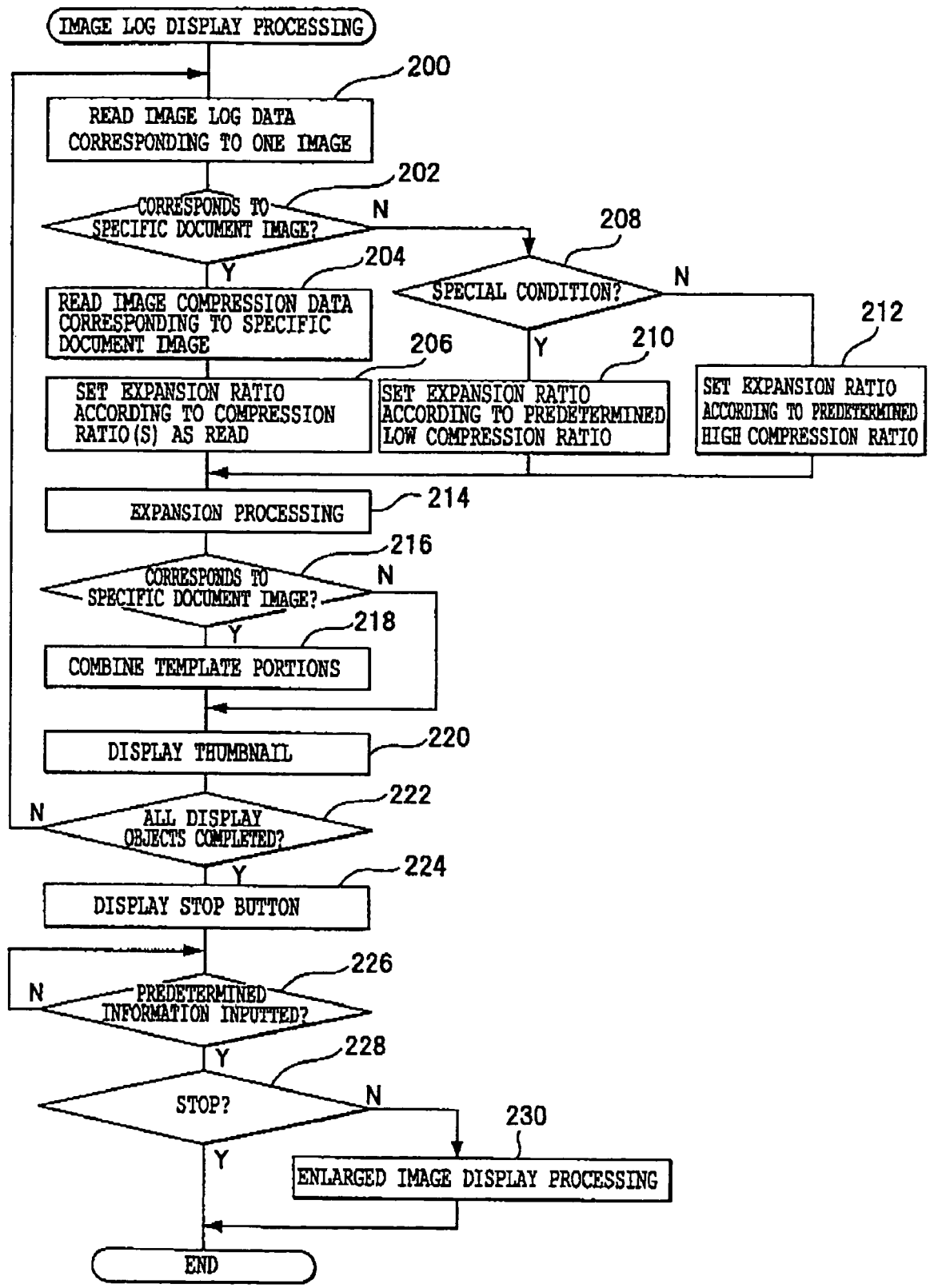
FIG. 8 is a flowchart showing a flow of processing of an image log display processing program relating to the embodiment of the present invention.

Next, operation of the digital multifunction device 10 when the image log display function is executed will be described with reference to FIG. 8. FIG. 8 is a flowchart showing a flow of processing of an image log display processing program which is executed by the CPU 12 of the digital multifunction device 10 at a predetermined timing (here, a time of input by a user of an instruction which designates execution of the image log display function, which input is performed via the display 64). This program is memorized beforehand at a predetermined region of the ROM 16. Here, a case will be described in which a timeframe, which serves as a subject of display of the image log data, is set beforehand by a user.

First, in step 200, image log data (see FIG. 6; below referred to as "processing object log data") corresponding to a single image which corresponds with the above-mentioned timeframe serving as a subject of display is read from the hard disk 30. In a next step 202, it is determined whether or not information representing a specific document image is included in the processing object log data, and thus it is determined whether or not the processing object log data corresponds to image data which represents a specific document image. If this judgment is positive, the control advances to step 204.

In step 204, compression ratios of each of image regions corresponding to the information representing the specific document image that is included in the processing object log data are read from the image compression data (see FIG. 5). In a next step 206, the compression/expansion processing section 32 is set so as to perform expansion processing at each image region with an expansion ratio that corresponds to the compression ratio which has been read. Thereafter, the control advances to step 214.

Alternatively, if the judgment in step 202 is negative, the control advances to step 208. Referring to information on magnification and paper size in the information representing processing details that is included in the processing object log data, it is determined whether or not the executed image processing was performed with the previously discussed special conditions. If this determination is positive, the control advances to step 210, the compression/expansion processing section 32 is set so as to perform expansion processing with a expansion ratio that corresponds to the aforementioned predetermined low compression ratio (40% in the present embodiment) at all image regions, and the control thereafter advances to step 214.

On the other hand, if the determination in step 208 is negative, the control advances to step 212, the compression/expansion processing section 32 is set so as to perform expansion processing with a expansion ratio that corresponds to the aforementioned predetermined high compression ratio (80% in the present embodiment) at all image regions, and the control thereafter advances to step 214.

In step 214, the compression/expansion processing section 32 is instructed to execute expansion processing on the image data included in the processing object log data. Accordingly, the compression/expansion processing section 32 implements the expansion processing with the expansion conditions specified in one of step 206, step 210 and step 212.

In a next step 216, it is determined, in a similar manner to step 202, whether or not the processing object log data corresponds to image data representing a specific document image. If this judgment is positive, the control advances to step 218. The template data corresponding to that specific document image (see FIG. 3) is read from the hard disk 30, and this template data is combined with the image data that has been decompressed by the processing of step 214. Thereafter, the control advances to step 220. By the processing of step 218, it is possible to reconstruct the image portions which were erased by the processing of step 108 of the previously described image log registration processing program.

Alternatively, if the judgment of step 216 is negative, the control advances to step 220 without executing the processing of step 218.

In step 220, control is performed so as to create a thumbnail image of the image represented by the image data that has been obtained by the above-described processing, and to display this thumbnail image with information additional to the image data that is included in the processing object log data at the display 64. Thereafter, the control advances to step 222.

In step 222, it is determined whether or not the above processing of step 200 to step 220 has been completed for all image log data corresponding to the display subject timeframe that was specified beforehand by the user. If this determination is negative, the control returns to step 200. When this determination is positive, the control advances to step 224. Here, when the above-described steps 200 to 222 are to be repeatedly executed, the processing object log data will be image log data which has not previously been the object of processing.

In step 224, control is performed so as to display a Stop button, which will be operated when termination of the present image log display processing program is to be instructed, at a predetermined position of the display 64. In a next step 226, a wait for input of predetermined information is implemented.

By the processing described above, an image, shown by an example in FIG. 9, is displayed at the display 64. In the image shown in FIG. 9, the thumbnail image and the information additional to image data that is included in the processing object log data are displayed in a list. When an image as shown in FIG. 9 is displayed at the display 64, if a thumbnail image that is to be shown enlarged is present, the user selects that thumbnail image with a fingertip, and if the present image log display processing program is to be terminated, the user selects the Stop button with a fingertip. Hence, the judgment of step 226 is positive and the control advances to step 228.

In step 228, it is determined whether or not the Stop button has been selected by the user. If this determination is positive, the present image log display processing program ends. On the other hand, if this determination is negative, the control advances to step 230 and processing is executed to display an enlarged image of the thumbnail image selected by the user (i.e., the original image on which the thumbnail image is based) at the display 64. Thereafter, the present image log display processing program ends.

As has been described in detail hereabove, according to the present embodiment, when predetermined processing relating to image data is executed, log data representing processing details of the predetermined processing is recorded in a state in which the image data is included therein, and it is judged whether or not an image represented by the image data is a pre-specified document image (herein, the specific document images). If it is judged that the image is a pre-specified document image, the image data is compressed with a lower compression ratio than in other cases, and the log data is recorded in a state in which this compressed image data is included therein. Thus, it is possible to record image data which can reproduce images of high quality for specific images, while reducing recording volumes of image data, and it is possible to reconstruct all areas of images represented by the image data.

In addition, according to the present embodiment, characteristic data representing characteristics of the pre-specified document images (herein, the template data) is memorized in advance by the memorization component (herein, the hard disk 30), and it is judged whether or not the image represented by the image data is the pre-specified document image by pattern-matching of the image data with the characteristic data. Thus, this judgment can be performed automatically and simply.

In particular, according to the present embodiment, the characteristic data is characteristic image data representing images which are characteristic of the pre-specified document image. If it has been judged that the image is the pre-specified document image, the characteristic image data is erased from the image data, and the image data from which the characteristic image data has been erased is compressed by a compression component (herein, the compression/expansion processing section 32). Thus, it is possible to further reduce recording volumes of image data in comparison with a case of compression in a state in which this characteristic image data is not erased.

Further, according to the present embodiment, the image data is compressed with compression ratios being altered between respective regions of different categories in the image represented by the image data. Thus, it is possible to perform compression of each image region with a compression ratio that is appropriate for an image quality that will be required at a time of reconstruction.

Further again, according to the present embodiment, it is determined whether or not the predetermined processing is performed with a pre-specified special condition. If it is judged that the image is not a pre-specified document image but it is judged that the predetermined processing is performed under the pre-specified special condition, the image data is compressed by the compression component with a compression ratio which is lowered in comparison with a case in which it is judged that the image is not a pre-specified document image and it is judged that the predetermined processing is not performed with the pre-specified special condition. Thus, even when the predetermined processing is performed with the pre-specified special conditions, it is possible to record the image data in a state from which it will be possible to reconstruct an image of high quality.

In particular, according to the present embodiment, the special conditions are that a reduction ratio is special when control is performed to form the image represented by the image data to be reduced, that a magnification ratio is special when control is performed to form the image represented by the image data to be enlarged, and that size of an image formation medium (herein, recording paper) is special when control is performed for forming the image represented by the image data. Thus, it is possible to record image data that corresponds to these conditions in states from which it is possible to reconstruct images with high quality.

Anyway, for the present embodiment, a case has been described in which the JPEG format is employed as the compression format of the image data. However, the present invention is not limited thus, and modes are possible in which lossless compression formats such as, for example, the MR (Modified READ Code) format, the MMR (Modified Modified READ Code) and the like are employed. In such cases too, the same effects as with the present embodiment can be achieved.

Moreover, a case has been described for the present embodiment in which template data representing outline images (straight line images) is employed as the characteristic data of the present invention. However, the present invention is not limited thus, and modes are possible in which image data representing images themselves such as, for example, mark images, schema images, background images, official stamps, and the like, which represent characteristics of specific document images, are employed. In such cases too, the same effects as with the present embodiment can be achieved.

Furthermore, obviously, a technique for pattern-matching of the present invention is not limited to the method described for the present embodiment, and various conventionally known pattern-matching techniques can be employed.

In addition, the structure of the digital multifunction device 10 described for the present embodiment (see FIGS. 1 and 2) is an example, and obviously suitable modifications can be applied within a scope which does not depart from the spirit of the present invention.

Further, the flows of processing of each of the image log registration processing program and the image log display processing program that have been described for the present embodiment (see FIGS. 7 and 8) are also examples, and obviously suitable modifications can be applied within a scope which does not depart from the spirit of the present invention.

Further, the structure of the image display illustrated for the present embodiment (see FIG. 9) is also an example, and obviously suitable modifications can be applied within a scope which does not depart from the spirit of the present invention.

Further, the various data structures that have been illustrated for the present embodiment (see FIGS. 3, 5 and 6) are also examples, and obviously additional data can be added and unnecessary data can be removed as required.

Further yet, a case has been described for the present embodiment in which the present invention is applied to a digital multifunction device. However, the present invention can obviously be applied to any information device which is provided with functions for executing processing relating to image data, such as scanner devices, printer devices, facsimile devices and so forth.

As described earlier, a first aspect of the present invention is a log data recording device which, when predetermined processing relating to image data is executed, records log data, which represents processing details of the predetermined processing, in a state in which the image data is included, the log data recording device including: a judgment component, which judges whether or not an image represented by the image data is a pre-specified document image; a compression component which, if the image has been judged to be the pre-specified document image by the judgment component, compresses the image data with a compression ratio lower than a predetermined compression ratio; and a recording component, which records the log data in a state in which the image data compressed by the compression component is included, wherein the predetermined compression ratio is a compression ratio for compressing an image other than the pre-specified document image.

The log data recording device of the first aspect is a device which records log data, which represents processing details of predetermined processing relating to image data when the predetermined processing has been executed, in a state which includes image data. Herein, the predetermined processing can include image acquisition processing, for acquiring image data by reading an image of an original, image formation processing, for utilizing the image data to form an image, and image transmission processing, for transmitting the image data to an external device. The processing details of the predetermined processing can include: in a case in which the predetermined processing is the image acquisition processing, a date and time of image acquisition, a number of acquired images and an acquired image size; in a case in which the predetermined processing is the image formation processing, a date and time of image formation, a number of images formed and an image formation size; and in a case in which the predetermined processing is the image transmission processing, a date and time of image transmission, a number of transmitted images, and a transmitted image size.

Now, in the present invention, the judgment component determines whether or not the image represented by the image data is a pre-specified document image, the compression component compresses the image data with, if the judgment component judges that the image is a pre-specified document image, a compression ratio that is lowered relative to other cases, and the recording component records the log data in the state in which the image data that has been compressed by the compression component is included therein. Herein, locations of recording of log data by the recording component can include various kinds of memorization component, such as; semiconductor recording devices such as RAM (random access memory), EEPROM (electrically erasable and programmable read-only memory), Flash EEPROM and the like; portable recording media such as SMARTMEDIA, flexible discs and the like; fixed recording media such as hard disks and the like; external devices which are provided at server computers connected to networks and the like; and so forth.

That is, in the present invention, because the image data is compressed by the compression component, a recording volume of the image data can be reduced. Further, an object of compression at this time is not just a partial region of the image data but the image data itself. Hence, it is possible to reconstruct all regions of the image represented by the image data. Further, in the present invention, in a case in which the image represented by the image data is the pre-specified document image, the image data is compressed by the compression component with a compression ratio being lowered relative to other cases. The pre-specified document image is a particular image such as a license, a medical record, a passport or the like, and it is consequently possible to record image data from which an image can be reconstructed with higher quality for the particular image than for other images.

Herein, it is preferable if the compression ratio for a case in which the image represented by the image data is the pre-specified document image is a compression ratio such that contents of an image which can be reconstructed from the compressed image data can be visually verified. Further, in consideration of reducing a recording volume of the image data after compression, it is preferable to set a maximum compression ratio with which contents of the image that can be reconstructed from the compressed image data can be visually verified.

Thus, according to the log data processing device of the first aspect, at a time of execution of the predetermined processing relating to the image data, when the log data representing the processing details of the predetermined processing is to be recorded in the state in which the image data is included therein, it is judged whether or not the image represented by the image data is the pre-specified document image and, if the image is judged to be the pre-specified document image, the image data is compressed with a lower compression ratio than for other cases, and the log data is recorded in the state in which the compressed image data is included. Thus, it is possible to record image data which can reproduce a high quality image for a particular image, while reducing a recording volume of image data, in addition to which it is possible to reproduce all regions of images represented by the image data.

The log data recording device may further include a memorization component, at which characteristic data representing a characteristic of the pre-specified document image is pre-memorized, with the judgment component judging whether or not the image represented by the image data is the pre-specified document image by pattern-matching of the image data with the characteristic data. Herein, the memorization component can include, beside a memorization component which is set as a destination of recording of the log data by the recording component, a memorization component which is structured separately from that memorization component. Further, the characteristic data can include, beside the template data representing the format of the pre-specified document image, image data that represents a characteristic of the document image, such as a mark image, a schema image, a background image, an official stamp or the like.

The log data recording device may further include an erasure component which, if the image has been judged to be the pre-specified document image by the judgment component, erases characteristic image data from the image data, with the characteristic data being the characteristic image data, which represents an image which is characteristic of the pre-specified document image, and if the image has been judged to be the pre-specified document image by the judgment component, the compression component compressing the image data from which the characteristic image data has been erased by the erasure component.

In a case in which there is a plurality of image regions of different categories in the image represented by the image data, the compression component may compress the image data with a compression ratio being altered between the image regions. Herein, the categories of image regions can include photographic images and text images.

The log data recording device of claim 1 may further include a second judgment component, which judges whether or not the predetermined processing is performed with a pre-specified special condition, wherein, if it is judged by the judgment component that the image is not the pre-specified document image and it is judged by the second judgment component that the predetermined processing is performed with the pre-specified special condition, the compression component compresses the image data with a compression ratio which is lower than in a case in which it is judged by the judgement component that the image is not the pre-specified document image and it is judged by the second judgment component that the predetermined processing is not performed with the pre-specified special condition.

The predetermined processing may include image formation processing, which utilizes the image data to form an image, and the special condition may include at least one of a reduction ratio being special when operation is performed to form the image represented by the image data to be reduced, a magnification ratio being special when operation is performed to form the image represented by the image data to be magnified, and size of an image recording medium being special when operation is performed to form the image represented by the image data.

A second aspect of the present invention is a log data recording method for, when predetermined processing relating to image data is executed, recording log data, which represents processing details of the predetermined processing, in a state in which the image data is included, the log data recording method including: (a) judging whether or not an image represented by the image data is a pre-specified document image; (b) if the image has been judged to be the pre-specified document image, compressing the image data with a compression ratio lower than a predetermined compression ratio; and (c) recording the log data in a state in which the compressed image data is included, wherein the predetermined compression ratio is a compression ratio for compressing an image other than the pre-specified document image.

The second aspect of the present invention operates in a similar manner to the first aspect. Thus, similarly to the first aspect, it is possible to record image data which can reproduce a high quality image for a particular image, while reducing a recording volume of image data, and it is possible to reproduce all regions of images represented by the image data.

A third aspect of the present invention is a storage medium readable by a computer, the storage medium storing a program of instructions executable by the computer to perform a function for, when predetermined processing relating to image data is executed, recording log data, which represents processing details of the predetermined processing, in a state in which the image data is included, the function including the steps of: (a) judging whether or not an image represented by the image data is a pre-specified document image; (b) if the image has been judged to be the pre-specified document image, compressing the image data with a compression ratio lower than a predetermined compression ratio; and (c) recording the log data in a state in which the compressed image data is included, wherein the predetermined compression ratio is a compression ratio for compressing an image other than the pre-specified document image.

The third aspect of the present invention can operate in a similar manner to the first aspect. Thus, similarly to the first aspect, it is possible to record image data which can reproduce a high quality image for a particular image, while reducing a recording volume of image data, and it is possible to reproduce all regions of images represented by the image data.

As described above, according to the present invention, at a time of execution of predetermined processing relating to image data, when log data representing processing details of the predetermined processing is to be recorded in a state in which the image data is included therein, it is judged whether or not an image represented by the image data is a pre-specified document image and, if the image is judged to be the pre-specified document image, then the image data is compressed with a compression ratio which is lowered relative to other cases, and the log data is recorded in a state in which the compressed image data is included therein. Thus, excellent effects are provided in that, while a recording volume of image data is reduced, it is possible, for a particular image, to record image data which can reproduce a high quality image, in addition to which it is possible to reproduce a whole area of the image represented by the image data.

What is claimed is:

1. A log data recording device which records log data concerning a processing of image data, the log data recording device comprising:
    a judging unit that judges whether image data is a pre-specified document image;
    a compression unit that compresses the image data with a first compression ratio, if the judging unit determines that the image data is the pre-specified document image, the first compression ratio is different from a second compression ratio for compressing image data other than the pre-specified document image; and
    a recording unit that records the log data by storing the compressed image data with the log data, wherein the pre-specified document image is determined by pattern-matching the image data with a template image data to determine if the pre-specified document image matches with at least one of the template image data.

2. The log data recording device of claim 1, further comprising:
    a memory that stores characteristic data representing a characteristic of the pre-specified document image; wherein
    whether or not the image data is the pre-specified document image is judged based on pattern-matching of the image data with the characteristic data.

3. The log data recording device of claim 2, further comprising:
    an erasure unit that, if the image data is judged to be the pre-specified document image, erases the characteristic data from the image data; wherein
    the characteristic data is image data, which represents an image which is characteristic of the pre-specified document image, and
    if the image data is judged to be the pre-specified document image, the compression component compresses image data from which the characteristic data has been erased by the erasure unit.

4. The log data recording device of claim 1, wherein, if there is a plurality of image regions of different categories in the image data, the compression component compresses the image data varying a compression ratio according to the plurality of image regions.

5. The log data recording device of claim 1, wherein:
    if the image data is not judged to be the pre-specified document image and is judged to have been processed with a predetermined condition, the compression component compresses the image data with a third compression ratio, the third compression ratio is different from a fourth compression ratio for compressing image data which is not judged to be the pre-specified document image and is not judged to have been processed with the predetermined condition.

6. The log data recording device of claim 5, wherein the predetermined condition includes at least one of:
    a reduction ratio applied when the image data is reduced,
    a magnification ratio applied when the image data is magnified, and
    a size of an image recording medium on which the image data is formed.

7. A log data recording method using a processor for recording log data concerning a processing of image data, the method using a processor comprising:
    judging whether the image data is a pre-specified document image;
    compressing, if the image data is judged to be the pre-specified document image, the image data with a first compression ratio, the first compression ratio is different from a second compression ratio for compressing image data other than the pre-specified document image; and
    recording the log data by storing the compressed image data with the log data, wherein at least one of the steps is performed by a processor, and wherein the pre-specified document image is determined by pattern-matching the image data with a template image data to determine if the pre-specified document image matches with at least one of the template image data.

8. The log data recording method of claim 7, further comprising:
    storing characteristic data representing a characteristic of the pre-specified document image; wherein
    whether or not the image data is the pre-specified document image is judged based on pattern-matching of the image data with the characteristic data.

9. The log data recording method of claim 8, further comprising:
    erasing, if the image data is judged to be the pre-specified document image, the characteristic data from the image data; and
    compressing, if the image data is judged to be the pre-specified document image, image data from which the characteristic image data has been erased, wherein:
    the characteristic data is image data which represents an image which is characteristic of the pre-specified document image.

10. The log data recording method of claim 7, wherein:
    if there is a plurality of image regions of different categories in the image data, the compressing of the image data is performed varying a compression ratio according to the plurality of image regions.

11. The log data recording method of claim 7, wherein:
    if the image data is not judged to be the pre-specified document image and is judged to have been processed with a predetermined condition, the compressing of the image data is performed with a third compression ratio, the third compression ratio is different from a fourth compression ratio for compressing image data which is not judged to be the pre-specified document image and is not judged to have been processed with the predetermined condition.

12. The log data recording method of claim 11, wherein the predetermined condition includes at least one of:
    a reduction ratio applied when the image data is reduced,
    a magnification ratio applied when the image data is magnified, and
    a size of an image recording medium on which the image data is formed.

13. A storage medium readable by a computer, the storage medium storing a program of instructions executable by the computer to perform a function for recording log data concerning a processing of image data, the function comprising:

judging whether the image data is a pre-specified document image;

compressing, if the image data is judged to be the pre-specified document image, the image data with a first compression ratio, the first compression ratio is different from a second compression ratio for compressing image data other than the pre-specified document image; and recording the log data by storing the compressed image data with the log data, wherein the pre-specified document image is determined by pattern-matching the image data a with template image data to determine if the pre-specified document image matches with at least one of the template image data.

14. The storage medium of claim 13, the function further comprising:

storing characteristic data representing a characteristic of the pre-specified document image; wherein whether or not the image data is the pre-specified document image is judged based on pattern-matching of the image data with the characteristic data.

15. The storage medium of claim 14, the function further comprising:

erasing, if the image data is judged to be the pre-specified document image, the characteristic data from the image data; and compressing, if the image data is judged to be the pre-specified document image, image data from which the characteristic image data has been erased, wherein:

the characteristic data is image data which represents an image which is characteristic of the pre-specified document image.

16. The storage medium of claim 13, wherein:

if there is a plurality of image regions of different categories in the image data, the compressing of the image data is performed varying a compression ratio according to the plurality of image regions.

17. The storage medium of claim 13, wherein:

if the image data is not judged to be the pre-specified document image and is judged to have been processed with a predetermined condition, the compressing of the image data is performed with a third compression ratio, the third compression ratio is different from a fourth compression ratio for compressing image data which is not judged to be the pre-specified document image and is not judged to have been processed with the predetermined condition.

18. The storage medium of claim 17, wherein the predetermined condition includes at least one of:

a reduction ratio applied when the image data is reduced, a magnification ratio applied when the image data is magnified, and a size of an image recording medium on which the image data is formed.

19. A log data recording device which records log data concerning a processing of image data, the log data recording device comprising:

a compression unit that, if the image data is judged to be a pre-specified document image, compresses the image data with a first compression ratio, the first compression ratio is different from a second compression ratio for compressing image data other than the pre-specified document image;

a recording unit that records the log data including the compressed image data;

a memory that stores characteristic data representing a characteristic of the pre-specified document image, wherein whether or not the image data is the pre-specified document image is judged based on pattern-matching of the image data with the characteristic data; and an erasure unit that, if the image data is judged to be the pre-specified document image, erases the characteristic data from the image data, wherein the characteristic data is image data, which represents an image which is characteristic of the pre-specified document image, if the image data is judged to be the pre-specified document image, the compression component compresses image data from which the characteristic data has been erased by the erasure unit, and wherein the pre-specified document image is determined by pattern-matching the image data with template image data to determine if the pre-specified document image matches with at least one of a template image data.

20. A log data recording method using a processor for recording log data concerning a processing of image data, the method using a processor comprising:

compressing, if the image data is judged to be a pre-specified document image, the image data with a first compression ratio, the first compression ratio is different from a second compression ratio for compressing image data other than the pre-specified document image;

recording the log data including the compressed image data;

storing characteristic data representing a characteristic of the pre-specified document image, wherein whether or not the image data is the pre-specified document image is judged based on pattern-matching of the image data with the characteristic data;

erasing, if the image data is judged to be the pre-specified document image, the characteristic data from the image data; and compressing, if the image data is judged to be the pre-specified document image, image data from which the characteristic image data has been erased, wherein the characteristic data is image data which represents an image which is characteristic of the pre-specified document image, and wherein the pre-specified document image is determined by pattern-matching the image data with template image data to determine if the pre-specified document image matches with at least one of a template image data.

21. A storage medium readable by a computer, the storage medium storing a program of instructions executable by the computer to perform a function for recording log data concerning a processing of image data, the function comprising:

compressing, if the image data is judged to be a pre-specified document image, the image data with a first compression ratio, the first compression ratio is different from a second compression ratio for compressing image data other than the pre-specified document image;

recording the log data including the compressed image data;

storing characteristic data representing a characteristic of the pre-specified document image, wherein whether or not the image data is the pre-specified document image is judged based on pattern-matching of the image data with the characteristic data;

erasing, if the image data is judged to be the pre-specified document image, the characteristic data from the image data; and compressing, if the image data is judged to be the pre-specified document image, image data from which the characteristic image data has been erased, wherein the characteristic data is image data which represents an image which is characteristic of the pre-specified document image, and wherein the pre-specified document image is determined by pattern-matching the image data with template image data to determine if the pre-specified document image matches with at least one of a template image data.

* * * * *